United States Patent
Ohmori

(10) Patent No.: US 8,746,099 B2
(45) Date of Patent: Jun. 10, 2014

(54) CONTROL SYSTEM OF TRANSMISSION

(75) Inventor: Ikuo Ohmori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 13/570,086

(22) Filed: Aug. 8, 2012

(65) Prior Publication Data

US 2013/0047760 A1  Feb. 28, 2013

(30) Foreign Application Priority Data

Aug. 31, 2011  (JP) ................................. 2011-188397

(51) Int. Cl.
 *F16H 59/00*  (2006.01)
 *F16H 3/08*  (2006.01)

(52) U.S. Cl.
 USPC ............................................... 74/335; 74/331

(58) Field of Classification Search
 USPC ............................................ 74/330, 331, 335
 See application file for complete search history.

(56) References Cited

U.S. PATENT DOCUMENTS

| | | | |
|---|---|---|---|
| 6,183,393 B1 * | 2/2001 | Habeck .......................... | 477/117 |
| 6,375,597 B1 * | 4/2002 | Popp et al. ....................... | 477/97 |
| 6,439,362 B2 * | 8/2002 | Reik et al. ...................... | 192/3.56 |

FOREIGN PATENT DOCUMENTS

| | | |
|---|---|---|
| JP | 2007-255558 | 10/2007 |
| JP | 2010-151303 | 7/2010 |
| JP | 2011-85244 A | 4/2011 |
| JP | 2011-121414 | 6/2011 |

OTHER PUBLICATIONS

Japanese Decision of Granting a Patent Application No. 2011-188397 (with English Translation), Drafting Date: Jul. 2, 2013.

* cited by examiner

*Primary Examiner* — Ha D Ho
(74) *Attorney, Agent, or Firm* — Arent Fox LLP

(57) ABSTRACT

A transmission control system to enable smooth engagement of meshing engagement device when establishing a forward gear position by engaging the meshing engagement device and a forward clutch while a vehicle is stationary. For example, when a synchro device is operated so as to establish a predetermined forward gear position, it becomes difficult to smoothly couple a first speed drive gear to the input shaft by the synchro device. However, temporarily engaging a reverse clutch during the process of operation of the synchro device allows a reverse torque to act on the first speed drive gear to apply torsion to a power transmission path between the first speed drive gear and a driven wheel. Furthermore, a repulsive force is applied and generates backlash between the synchro device and the first speed drive gear, thus enabling smooth operation of the synchro device.

12 Claims, 9 Drawing Sheets

FIG. 4

| SCHEMATIC DRAWING | CONTROL | PHENOMENON |
|---|---|---|
| (A) | LOW SHIFT START | CLUTCH DRAG TORQUE IS LARGE; DUE TO SYNCHRO BALK, SLEEVE CANNOT CARRY OUT SHIFT SLIDE. FOR GEAR SIDE, BACKLASH IS TAKEN UP IN FWD DIRECTION AND THERE IS TORSION. |
| (B) | RVS CLUTCH OPERATION LOW SHIFT CONTINUED | SYNCHRO IS STILL BALKED; FOR GEAR SIDE, DUE TO OPERATION OF RVS CLUTCH, BACKLASH IS TAKEN UP AND THERE IS TORSION IN RVS DIRECTION. |
| (C) | RVS CLUTCH RELEASE LOW SHIFT CONTINUED | TORSION RETURNS AT TIME OF RVS CLUTCH RELEASE, SYNCHRO RELATIVE SLIDING SPEED GREATLY DECREASES, BALKING IS RELEASED, SLEEVE STARTS TO CARRY OUT SHIFT SLIDE. |
| (D) | LOW SHIFT CONTINUED AND ENDED | SINCE BALKING OF SYNCHRO IS RELEASED, SLEEVE CARRIES OUT SHIFT SLIDE MOMENTARILY AND SHIFT IS COMPLETED. |

CONTROL SYSTEM OF TRANSMISSION

BACKGROUND

1. Field

The present invention relates generally to transmission control systems, and more specifically to a transmission control system that establishes a predetermined forward gear position.

2. Background

Various types of conventional transmission control systems are known in the art. For example, one such conventional transmission control system involves a twin clutch type transmission equipped with a synchro device, wherein rotation-restricting means are provided in first and second clutches located between a main input shaft and first and second auxiliary input shafts. According to this control system, when carrying out a pre-shift to a first speed gear position or a reverse gear position by operating the synchro device (such as when the vehicle is stationary), relative rotation between the synchro device and the gear is suppressed by the rotation restricting means. The rotation restriction means of this known solution thereby restricts rotation of the first and second auxiliary input shafts by causing drag torque of the first and second clutches, which are wet multi-plate clutches. This conventional solution provides a smooth pre-shift, and is described, for example, in Japanese Patent Application Laid-Open No. 2011-85244.

In the above-mentioned conventional arrangement, because it is necessary to provide special rotation restricting means in order to enable smooth operation of the synchro device, there is a large number of components, which produces a corresponding weight increase. Furthermore, in the above-mentioned conventional arrangement, even in a state in which rotation of the first and second auxiliary input shafts is restricted by the rotation restricting means, rotation of the synchro device is resisted due to the viscosity of lubricating oil attached to friction plates of the first and second clutches. Because of this, it is difficult to make phases of the gear and the sleeve of the synchro device interact smoothly.

SUMMARY

The following presents a simplified summary of one or more aspects of the present invention in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present invention was developed in light of the above-mentioned circumstances, and it is an object thereof to enable smooth operation of meshing engagement means when establishing a forward gear position by engaging the meshing engagement means and a forward clutch While a vehicle is stationary. To attain this advantageous effect, a transmission control system is provided comprising a gear shaft for transmitting a driving force of a drive source to a driven wheel, a forward gear relatively rotatably supported on the gear shaft, a forward frictional engagement element for transmitting the driving force from the drive source to the forward gear, a meshing engagement element for coupling the forward gear to the gear shaft, a reverse gear train connected to the forward gear, and a reverse frictional engagement element provided in the reverse gear train. Furthermore, after the meshing engagement element is operated to couple the forward gear to the gear shaft, a predetermined forward gear position is established by engaging the forward frictional engagement element. Additionally, by operation of the meshing engagement element, the reverse frictional engagement element is temporarily engaged in a predetermined operating pattern according to a predetermined parameter.

Further, according to additional aspects, a transmission control system is provided wherein a predetermined parameter is transmission oil temperature, and the predetermined operating pattern is engagement time for the reverse frictional engagement element. In an example aspect, the lower the oil temperature, the longer the engagement time is set.

Additionally, a transmission control system is provided Wherein the transmission comprises an input shaft (e.g. a gear shaft), an idle shaft that rotates in the reverse direction of the input shaft, an output shaft that is driven by the input shaft or the idle shaft, a gear provided on the output shaft that meshes with the forward gear, and a reverse idle gear provided on the idle shaft, wherein the reverse idle gear can be coupled to the idle shaft by the reverse frictional engagement element. In an additional aspect, the reverse frictional engagement element may be a hydraulic clutch.

Herein, a first input shaft 11 of the present embodiments corresponds to the gear shaft or input shaft of the present invention; a first speed drive gear 21 of the present embodiments corresponds to the forward gear of the present invention; a first speed-second speed-reverse driven gear 30 or a first speed-second speed-third speed-reverse driven gear 30 of the present embodiments corresponds to the gear of the present invention; a first clutch C1 of the present embodiments corresponds to the forward frictional engagement element of the present invention; a reverse clutch CR of the present embodiments corresponds to the reverse frictional engagement element of the present invention; an engine E of the present embodiments corresponds to the drive source of the present invention; a first speed-third speed synchro device S1 or a first speed-fourth speed synchro device S1 of the present embodiments corresponds to the meshing engagement element of the present invention; and a twin clutch type transmission T or a triple clutch type transmission T of the present embodiments corresponds to the transmission of the present invention.

In accordance with an example transmission control arrangement presented herein, when the forward frictional engagement element is engaged in a state in which the forward gear is coupled to the gear shaft by the meshing engagement means, a predetermined forward gear position may be established. When the meshing engagement means is operated, a torque of the engine acts on the meshing engagement means provided on the gear shaft as a drag torque of the forward clutch whose engagement has been released. Because of this torque; it becomes difficult to smoothly couple the gear to the gear shaft by the meshing engagement means. However, temporarily engaging the reverse frictional engagement element during the process of operation of the meshing engagement means allows a torque in the reverse direction to act on the gear, applying torsion to a power transmission path between the gear and the driven wheel. This allows the drag torque to be greatly decreased due to a reaction to the torsion being released at the instant at which engagement of the reverse frictional engagement element is released. Alternatively or additionally, it allows backlash to be generated between the engagement means and the gear, thus enabling smooth operation of the meshing engagement means. In this way, smooth operation of the meshing engagement means is enabled by utilizing the reverse clutch, which is already present in the transmission. Therefore, it is unnecessary to provide a special member, which minimizes the number of components and the system weight.

Furthermore, according to an aspect, the engagement time of the reverse frictional engagement element is controlled based on the oil temperature of the transmission. Specifically, a balk release torque is generated that corresponds to the drag torque of the forward frictional engagement element and changes in response to the viscosity of the lubricating oil, which allows for smooth operation of the meshing engagement element. Moreover, because the transmission oil temperature is inversely proportional to the engagement time length of the reverse frictional engagement element, when the viscosity of the lubricating oil becomes higher and the drag torque of the forward frictional engagement element acts on the forward gear more strongly, the balk release torque is increased. This enables smooth operation of the meshing engagement element.

In an aspect contemplated herein, the gear provided on the output shaft meshes with the forward gear provided on the input shaft and the reverse idle gear provided on the idle shaft, and the reverse idle gear can be coupled to the idle shaft by means of the reverse frictional engagement element. In this arrangement, engaging the reverse clutch allows the driving force of the engine to drive the forward gear in the reverse direction via the idle shaft, the reverse clutch, the reverse idle gear, and the gear on the output shaft, thereby applying torsion to the power transmission path between the forward gear and the driven wheel in the reverse direction. Moreover, in an aspect, because the reverse frictional engagement element is a hydraulic clutch, it becomes easy to carry out control when giving a predetermined balk release torque to the forward gear by engaging the reverse frictional engagement element for a predetermined time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 presents a diagram for explaining an operation of a first speed-third speed synchro device at the time of first speed pre-shift;

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
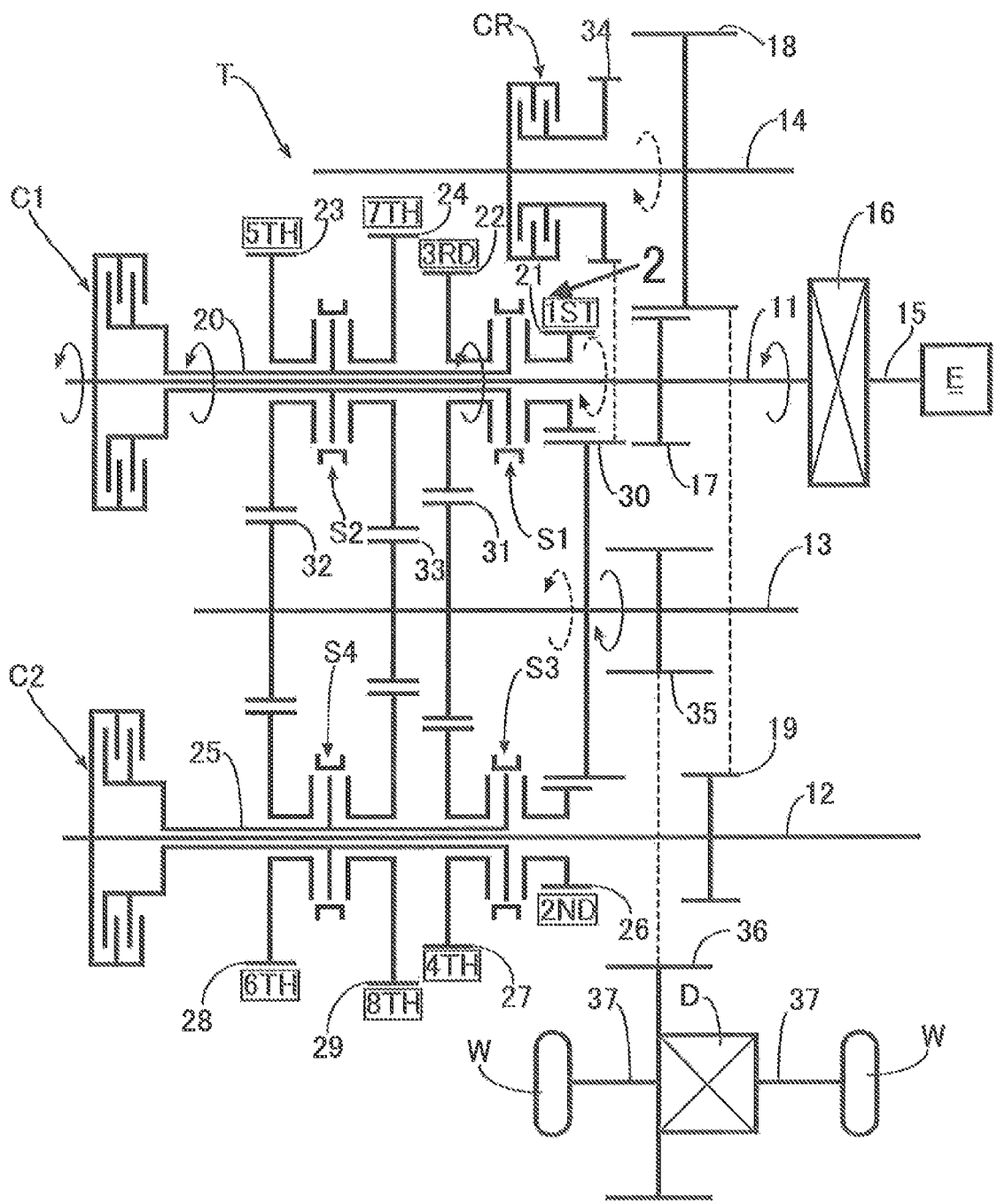
FIG. 1 presents a skeleton diagram of a twin clutch type transmission (first embodiment)

A FIG. 1 embodiment of the present invention is explained below by reference to FIGS. 1 to 7. As shown in FIG. 1, a twin clutch type transmission T with eight forward speeds and one reverse speed includes a first input shaft 11, a second input shaft 12, an output shaft 13, and an idle shaft 14, which may be disposed in parallel. The first input shaft 11 may be connected to a crankshaft 15 of an engine F via a torque converter 16 that may function as a starting device. A drive gear 17 may be attached to the first input shaft 11 meshes with an idle gear 18 on the idle shaft 14. The idle gear 18 may mesh with a driven gear 19 on the second input shaft 12. The second input shaft 12 may thereby rotate in the same direction at a predetermined ratio relative to the first input shaft 11, and the idle shaft 14 may rotate in the reverse direction at a predetermined ratio relative to the first input shaft 11.

Furthermore, a first sleeve 20 may be relatively rotatably fitted around an outer periphery of the first input shaft 11, the first sleeve 20 being capable of being coupled to the first input shaft 11 via a first clutch C1, which may be a wet multi-plate hydraulic clutch. A first speed drive gear 21 may be relatively rotatably supported on the outer periphery of the first input shaft 11, and a third speed drive gear 22, a fifth speed drive gear 23, and a seventh speed drive gear 24 may be relatively rotatably supported on the outer periphery of the first sleeve 20. The first speed drive gear 21 and the third speed drive gear 22 can be coupled to the first sleeve 20 via a first speed-third speed synchro device S1. Furthermore, the fifth speed drive gear 23 and the seventh speed drive gear 24 can be coupled to the first sleeve 20 via a fifth speed-seventh speed synchro device S2.

A second sleeve 25 may be relatively rotatably fitted around an outer periphery of the second input shaft 12, the second sleeve 25 being capable of being coupled to the second input shaft 12 via a second clutch C2, which may be a wet multi-plate hydraulic clutch. A second speed drive gear 26 may be relatively rotatably supported on the outer periphery of the second input shaft 12, and a fourth speed drive gear 27, a sixth speed drive gear 28, and an eighth speed drive gear 29 may be relatively rotatably supported on the outer periphery of the second sleeve 25. The second speed drive gear 26 and the fourth speed drive gear 27 can be coupled to the second sleeve 25 via a second speed-fourth speed synchro device 53. Furthermore, the sixth speed drive gear 28 and the eighth speed drive gear 29 can be coupled to the second sleeve 25 via a sixth speed-eighth speed synchro device S4.

In addition, attached to the output shaft 13 may be a first speed-second speed reverse driven gear 30, a third speed-fourth speed driven gear 31, a fifth speed-sixth speed driven gear 32, and/or a seventh speed-eighth speed driven gear 33. The first speed-second speed-reverse driven gear 30 may simultaneously mesh with the first speed drive gear 21 and the second speed drive gear 26; the third speed-fourth speed driven gear 31 may simultaneously mesh with the third speed drive gear 22 and the fourth speed drive gear 27; the fifth speed-sixth speed driven gear 32 may simultaneously mesh with the fifth speed drive gear 23 and the sixth speed drive gear 28; and the seventh speed-eighth speed driven gear 33 may simultaneously mesh with the seventh speed drive gear 24 and the eighth speed drive gear 29.

Additionally, relatively rotatably supported on the idle shaft 14 is a reverse idle gear 34 that may continually mesh with the first speed-second speed-reverse driven gear 30. In an aspect, the reverse idle gear 34 may be capable of being coupled to the idle shaft 14 via a reverse clutch CR, which may be a wet multi-plate hydraulic clutch, In an additional aspect, a final drive gear 35 that may be fixed to the output shaft 13 meshes with a final driven gear 36 fixed to a gear box of a differential gear D, and drive shafts 37 extending left and right from the differential gear D are connected to driven wheels W. Therefore, when the first clutch C1 is engaged in a state in which the first speed drive gear 21 is coupled to the first sleeve 20 via the first speed-third speed synchro device S1, the driving force of the crankshaft 15 of the engine E may be transmitted, in an aspect, to the driven wheels W and may establish a first speed gear position via the following path:

torque converter 16→first input shaft 11→first clutch C1→first sleeve 20→first speed-third speed synchro device S1→first speed drive gear 21→first speed-second speed-reverse driven gear 30→output shaft 13→final drive gear 35→final driven gear 36→differential gear D→drive shafts 37.

Furthermore, when the second clutch C2 is engaged in a state in which the second speed drive gear 26 is coupled to the second sleeve 25 via the second speed-fourth speed synchro device S3, the driving force of the crankshaft 15 of the engine E may be transmitted to the driven wheels W and may establish a second speed gear position via the following path:

torque converter 16→first input shaft 11→drive gear 17→idle gear 18→driven gear 19→second input shaft 12→second clutch C2→second sleeve 25→second speed→fourth speed synchro device S3→second speed drive gear 26→first speed→second speed-reverse driven gear 30→output shaft 13→final drive gear 35→final driven gear 36→differential gear D→drive shafts 37.

Additionally, when the first clutch C1 is engaged in a state in which the third speed drive gear 22 is coupled to the first sleeve 20 via the first speed-third speed synchro device S1, the driving force of the crankshaft 15 of the engine B may be transmitted to the driven wheels W and may establish a third speed gear position via the following path:

torque converter 16→first input shaft 11→first clutch C1→first sleeve 20→first speed-third speed synchro device S1→third speed drive gear 22→third speed-fourth speed driven gear 31→output shaft 13→final drive gear 35→final driven gear 36→differential gear D→drive shafts 37.

Furthermore, when the second clutch C2 is engaged in a state in which the fourth speed drive gear 27 is coupled to the second sleeve 25 via the second speed-fourth speed synchro device S3, the driving force of the crankshaft 15 of the engine E may be transmitted to the driven wheels W and may establish a fourth speed gear position via the following path:

torque converter 16→first input shaft 11→drive gear 17→idle gear 18→driven gear 19→second input shaft 12→second clutch C2→second sleeve 25→second speed-fourth speed synchro device S3→fourth speed drive gear 27→third speed-fourth speed driven gear 31→output shaft 13→final drive gear 35→final driven gear 36→differential gear D drive shafts 37.

Furthermore, when the first clutch C1 is engaged in a state in which the fifth speed drive gear 23 is coupled to the first sleeve 20 via the fifth speed-seventh speed synchro device S2, the driving force of the crankshaft 15 of the engine E may be transmitted to the driven wheels W and may establish a fifth speed gear position via the following path:

torque converter 16→first input shaft 11→first clutch C1→first sleeve 20→fifth speed-seventh speed synchro device S2→fifth speed drive gear 23→fifth speed-sixth speed driven gear 32 output shaft 13→final drive gear 35→final driven gear 36→differential gear D→drive shafts 37.

In an additional aspect, when the second clutch C2 is engaged in a state in which the sixth speed drive gear 28 is coupled to the second sleeve 25 via the sixth speed-eighth speed synchro device S4, the driving force of the crankshaft 15 of the engine E may be transmitted to the driven wheels W and may establish, a sixth speed gear position via the following path:

torque converter 16→first input shaft 11→drive gear 17→idle gear 18→driven gear 19→second input shaft 12→second clutch C2→second sleeve 25→sixth speed-eighth speed synchro device S4→sixth speed drive gear 28→fifth speed-sixth speed driven gear 32→output shaft 13→final drive gear 35→final driven gear 36→differential gear D→drive shafts 37.

Furthermore, when the first clutch C1 is engaged in a state in which the seventh speed drive gear 24 is coupled to the first sleeve 20 via the fifth speed-seventh speed synchro device S2, the driving force of the crankshaft 15 of the engine E may be transmitted to the driven wheels W and may establish a seventh speed gear position via the following path:

torque converter 16→first input shaft 11→first clutch C1→first sleeve 20→fifth speed-seventh speed synchro device S2→seventh speed drive gear 24→seventh speed-eighth speed driven gear 33→output shaft 13→final drive gear 35→final driven gear 36→differential gear D→drive shafts 37.

In an additional aspect, when the second clutch C2 is engaged in a state in which the eighth speed drive gear 29 is coupled to the second sleeve 25 via the sixth speed-eighth speed synchro device S4, the driving force of the crankshaft 15 of the engine E may be transmitted to the driven wheels W and may establish an eighth speed gear position via the following path:

torque converter 16→first input shaft 11→drive gear 17→idle gear 18→driven gear 19→second input shaft 12→second clutch C2→second sleeve 25→sixth speed-eighth speed synchro device S4→eighth speed drive gear 29→seventh speed-eighth speed driven gear 33→output shaft 13→final drive gear 35→final driven gear 36→differential gear D→drive shafts 37.

In addition, when the reverse idle gear 34 is coupled to the idle shaft 14 via the reverse clutch CR, the driving force of the crankshaft 15 of the engine E may be transmitted in reverse rotation to the driven wheels W and may establish a reverse gear position via the following path:

torque converter 16→first input shaft 11→drive gear 17→idle gear 18→idle shaft 14→reverse clutch CR→reverse idle gear 34→first speed-second speed-reverse driven gear 30→output shaft 13→final drive gear 35→final driven gear 36→differential gear D→drive shafts 37.

Figure 2:
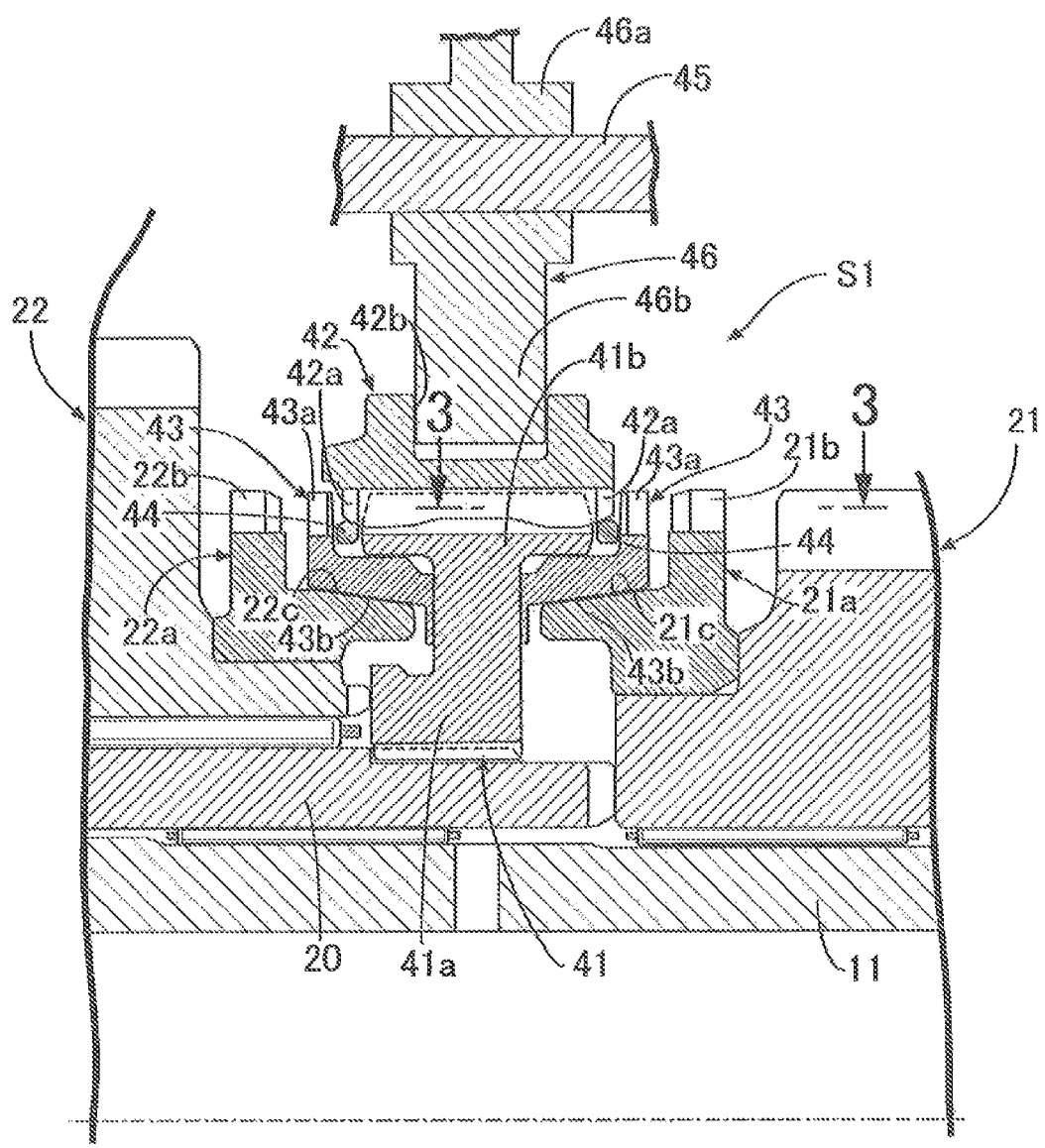
FIG. 2 presents an enlarged view of a part 2 of FIG. 1.
Figure 3:
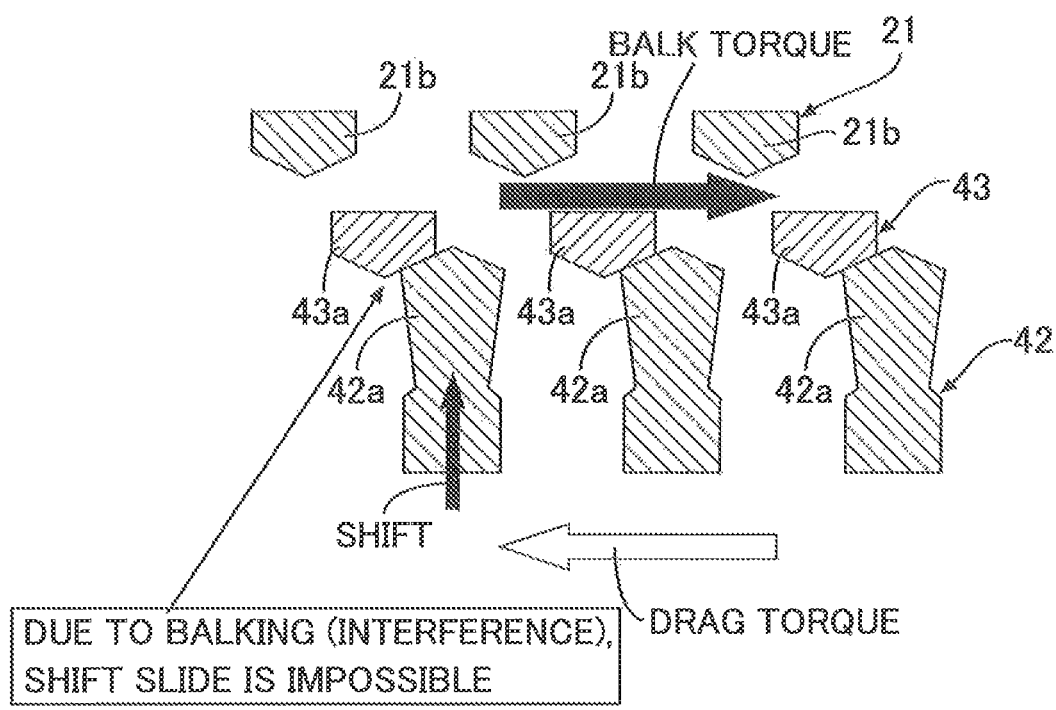
FIG. 3 presents a sectional view taken along a line 3-3 in FIG. 2.

As shown in FIG. 2 and FIG. 3, the first speed-third speed synchro device S1 may include a hub 41 having a boss portion 41a spline-fitted to the first sleeve 20, an annular sleeve 42 that is axially and slidably spline-fitted to a sleeve support portion 41b on an outer periphery of the hub 41, a blocking ring 43 disposed relatively rotatably between the speed drive gear 21 and the hub 41, and an annular synchronizer spring 44 disposed between the hub 41 and the blocking ring 43.

In an additional aspect, chamfers 42a that may be spline-fitted to an outer peripheral face of the hub 41 are formed on an inner peripheral face of the sleeve 42; chamfers 43a that can engage with the chamfers 42a of the sleeve 42 can be formed on an outer peripheral face of the blocking ring 43; and dog teeth 21b that can engage with the chamfers 42a of the sleeve 42 may be formed on an outer peripheral face of a chamfer-forming member 21a that is provided integrally with the first speed drive gear 21. Additionally, a conical face 43b may be formed on the inner periphery of the blocking ring 43, and a conical face 21c that abuts against the conical face 43b of the blocking ring 43 may be formed on an outer periphery of the first speed drive gear 21, A guide portion 46a of a shift fork 46 operated by a hydraulic actuator, which is not illustrated, may be slidably supported on a shift guide rod 45 disposed parallel to the first input shaft 11. In addition, the shift fork 46 includes a fork-shaped drive portion 46b that engages with an annular groove 42b formed on an outer periphery of the sleeve 42.

Here, the first speed-third speed synchro device S1, which may be disposed between the first speed drive gear 21 and the third speed drive gear 22, has a substantially symmetrical structure of FIG. 2. Furthermore, because the structure on the third speed drive gear 22 side is substantially the same as the structure on the first speed drive gear 21 side, duplication of the explanation thereof is omitted herein.

According to aspects of the present disclosure, to establish, for example, the first speed gear position, if the sleeve 42 is moved forward toward the first speed drive gear 21 by the shift fork 46 of the first speed-third speed synchro device S1, a load of the sleeve 42 moving forward is transmitted to the blocking ring 43 via the synchronizer spring 44, and the blocking ring 43 is thereby urged toward the first speed drive gear 21. When the sleeve 42 moves further forward, tooth tips of the chamfers 42a of the sleeve 42 and tooth tips of the chamfers 43a of the blocking ring 43 may abut against each other. Furthermore, the conical face 21c of the first speed drive gear 21 and the conical face 43b of the blocking ring 43 may conic into contact with each other, thus causing a conical torque due to frictional force to occur in a circumferential direction. This conical torque may synchronize rotation of the sleeve 42 and the first speed drive gear 21.

In addition, in an aspect, when the sleeve 42 moves further, the chamfers 42a of the sleeve 42 may push through the chamfers 43a of the blocking ring 43. Furthermore, the sleeve 42 and the blocking ring 43 may be integrally coupled, and the chamfers 42a of the sleeve 42 may engage with tooth tips of the dog teeth 21b of the first speed drive gear 21. When the sleeve 42 moves further forward, the chamfers 42a of the sleeve 42 may push through the dog teeth 21b of the first speed drive gear 21, and the chamfers 42a of the sleeve 42 may engage with the dog teeth 21b of the first speed drive gear 21.

However, a problem may occur when the twin clutch type transmission T carries out, in advance, a first speed pre-shift in which the first speed drive gear 21 is coupled to the first sleeve 20 by the first speed-third speed synchro device S1 when the vehicle is stationary, and in this state the first clutch C1 is engaged so as to establish the first speed gear position. Specifically, the problem occurs when the vehicle is stopped and engagement of the first clutch C1 is released and rotation of the crankshaft 15 of the idling engine E is transmitted via the torque converter 16 and the first input shaft 11 to the first clutch C1, for which engagement has been released. Due to a drag torque generated by lubricating oil present between the clutch disk and clutch plate of the first clutch C1, which may be a wet multi-plate hydraulic clutch, the first sleeve 20 attempts to rotate in the forward direction (see solid line arrow in FIG. 1). As shown in FIG. 4 (A), the hub 41 and the sleeve 42 of the first speed-third speed synchro device S1 connected to the first sleeve 20 attempt to rotate in the forward direction, In this process, where the vehicle is stationary, the power transmission path front the first speed drive gear 21 to the driven wheels W in this situation may be as follows:

first speed-second speed-reverse driven gear 30→output shaft 13→final drive gear 35→final driven gear 36→differential gear D→drive shafts 37.

Furthermore, draft shafts 37 may be in a restrained state. Additionally, the blocking ring 43, which, has the conical face 43b abutting against the conical face 21c of the first speed drive gear 21, may be restrained in the rotational and forward directions, and a drag torque may be transmitted to the power transmission path to receive backlash in the forward direction. This backlash may be in the form of a balk torque (see FIG. 3), which is a reactive force to the drag torque. Additionally, the chamfers 43a of the blocking ring 43 may be pressed against the chamfers 42a of the sleeve 42. As a result, the chamfers 42a of the sleeve 42 may not push through the chamfers 43a of the blocking ring 43. As such, forward movement of the sleeve 42 is inhibited, and the first speed pre-shift cannot be carried out smoothly.

According to aspects of the present disclosure, as shown in FIG. 4(B), at a stage where rotation of the first speed drive gear 21 and the sleeve 42 is synchronized, the reverse clutch CR may be temporarily engaged, and the torque of the crankshaft 15 of the engine E may transmitted to the first speed drive gear 21 via the following path:

torque converter 16→first input shaft 11→drive gear 17→idle gear 18→idle shaft 14→reverse clutch CR→reverse idle gear 34→first speed-second speed-reverse driven gear 30.

Through this path, the first speed drive gear 21 may be temporarily driven in the reverse direction (see broken line arrow in FIG. 1). As a result, torsion may be applied to the power transmission path from the first speed drive gear 21 to the driven wheels W in the reverse direction. This may result in backlash in the forward direction of the driving force transmission path being utilized.

Subsequently, as shown in FIG. 4(C), when engagement of the reverse clutch CR is released, due to a reaction to the torsion being released in the reverse direction of the driving force transmission path, the drag torque greatly decreases, and backlash may be generated in the blocking ring 43 and the first speed drive gear 21. Thus, the first speed drive gear 21 and the blocking ring 43 may be enabled to rotate in the forward direction by an index torque, which is a torque in the rotational direction caused by pressure contact between the chamfers 42a of the sleeve 42 and the chamfers 43a of the blocking ring 43. As a result, as shown in FIG. 4(D), the first speed drive gear 21 and the blocking ring 43 may rotate in the forward direction relative to the sleeve 42, and the chamfers 42a of the sleeve 42 may push through the chamfers 43a of the blocking ring 43 and further push through the dog teeth 21b of the first speed drive gear 21. As such, the first speed pre-shift may be completed.

Figure 5:
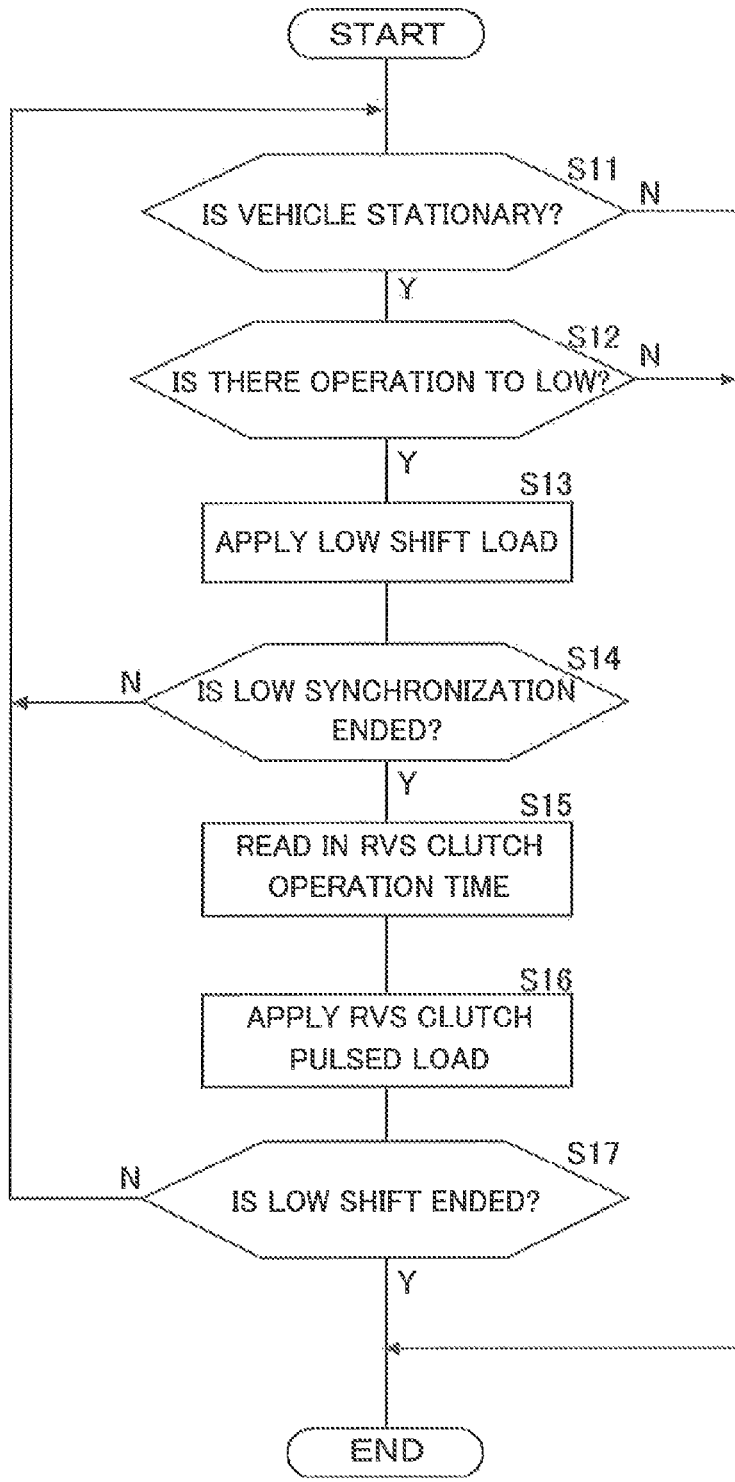
FIG. 5 presents a flow chart at the time of first speed pre-shift.

An exemplary operation of aspects described above is now explained by reference to the flow chart of FIG. 5. First, if in step S11 the vehicle is stationary, and if in step S12 the shift lever is operated to a "D" position and the first speed-third speed synchro device S1 is operated toward the first speed gear position, then in step S13 a shift load that drives the sleeve 42 of the first speed-third speed synchro device S1 toward the first speed drive gear 21 is applied. As a result, if in step S14 rotation of the sleeve 42 and the first speed drive gear 21 is synchronized, then in step S15 the operation time of the reverse clutch CR corresponding to an oil temperature (see FIG. 6) is read. Then, in step S16 the reverse clutch CR is engaged for the operation time by means of a pulsed engagement load. As a result, in step S17 the chamfers 42*a* of the sleeve 42 may engage with the chamfers 43*a* of the blocking ring 43 and the dog teeth 21*b* of the first speed drive gear 21 to complete the first speed pre-shift.

Figure 6:
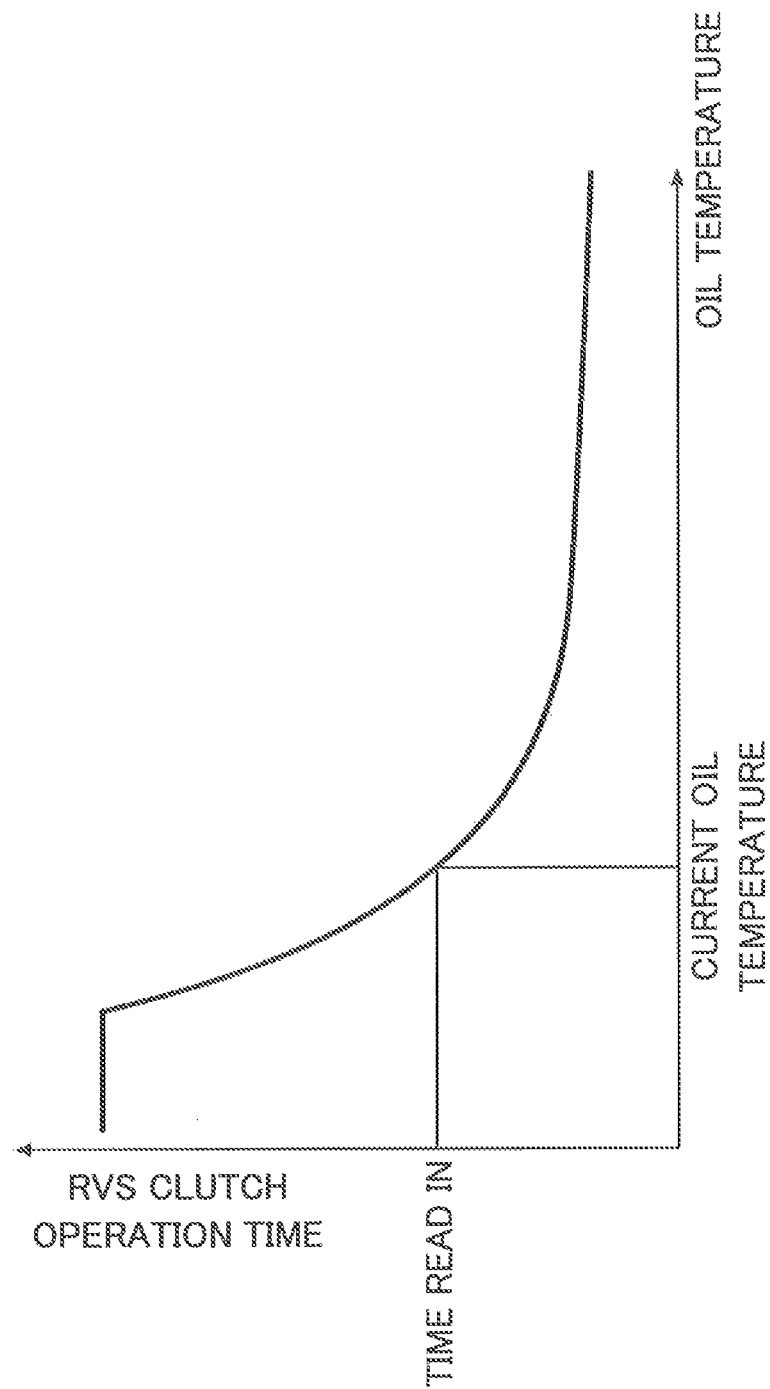
FIG. 6 presents a map used for looking up operation time for a reverse clutch from oil temperature.
Figure 7:
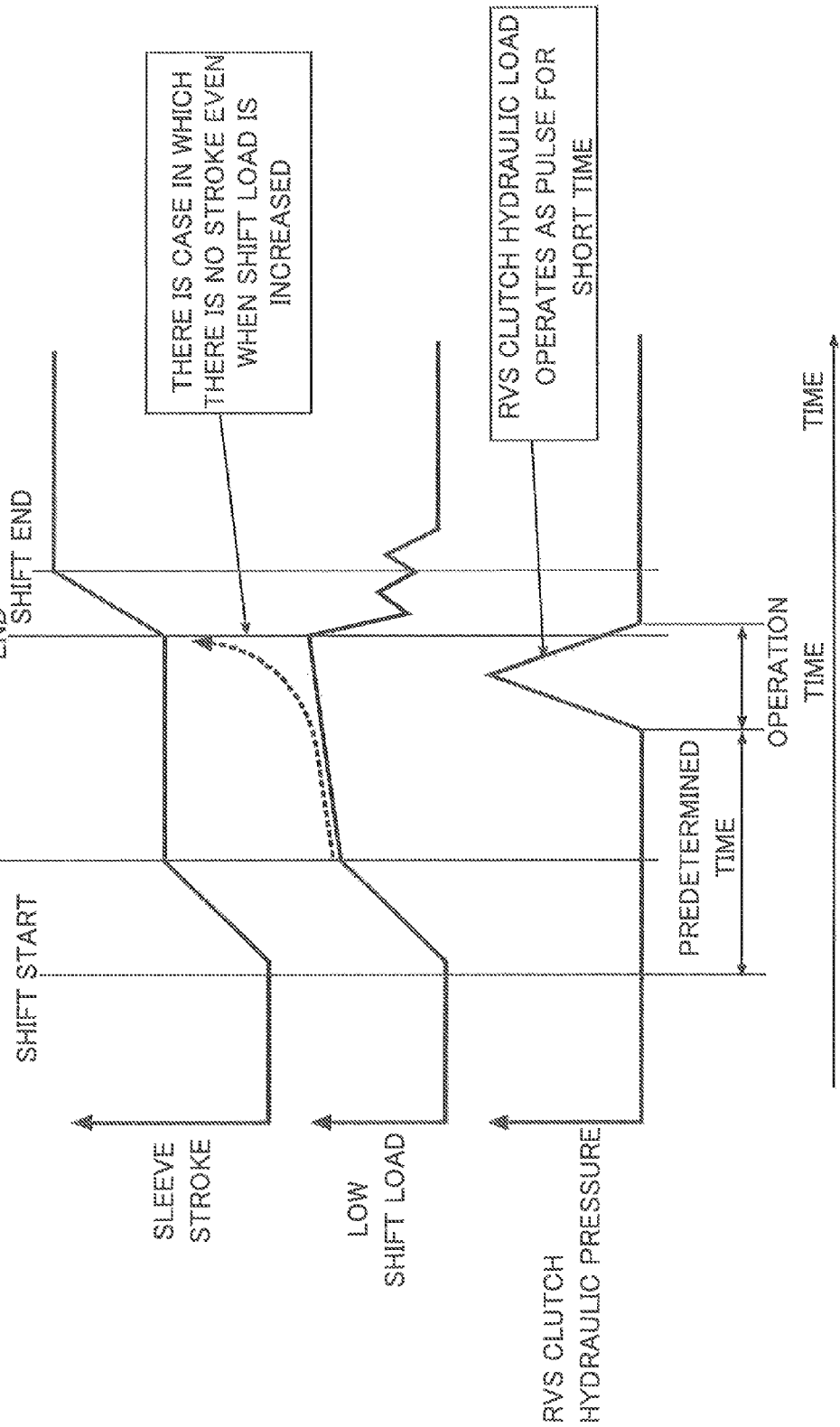
FIG. 7 presents a time chart at the time of first speed pre-shift.

Turning to FIG. 6, the lower the oil temperature of the transmission T, the longer the engagement time of the reverse clutch CR. This occurs because when the oil temperature is lower, the drag torque of the first clutch C1 and the balk torque become larger, and it therefore becomes difficult for the chamfers 42*a* of the sleeve 42 to push through the chamfers 43*a* of the blocking ring 43 and the dog teeth 21*b* of the first speed drive gear 21. However, in accordance with the present embodiment, as shown in FIG. 7, the reverse clutch CR may be engaged for a longer time when the oil temperature is lower. Therefore, sufficient torsion may be applied in the reverse direction to the driving force transmission path at the reverse gear position between the engine E and the driven wheels W, a sufficiently large repulsive force (balk release torque) may be generated at the instant when engagement of the reverse clutch CR is released. It is thereby possible to carry out a smooth first speed pre-shift by driving the blocking ring 43 and the first speed drive gear 21 in the forward direction relative to the sleeve 42.

As described above, in accordance with the present embodiment, since smooth operation of the first speed-third speed synchro device S1 is enabled by utilizing the reverse clutch CR in the transmission T, it is unnecessary to provide a special member, which limits any increase in the number of components or the system weight. Furthermore, when a hydraulic clutch is used for the reverse clutch CR rather than a dog clutch, it becomes relatively easier to control the engagement time and the engagement force.

Figure 8:
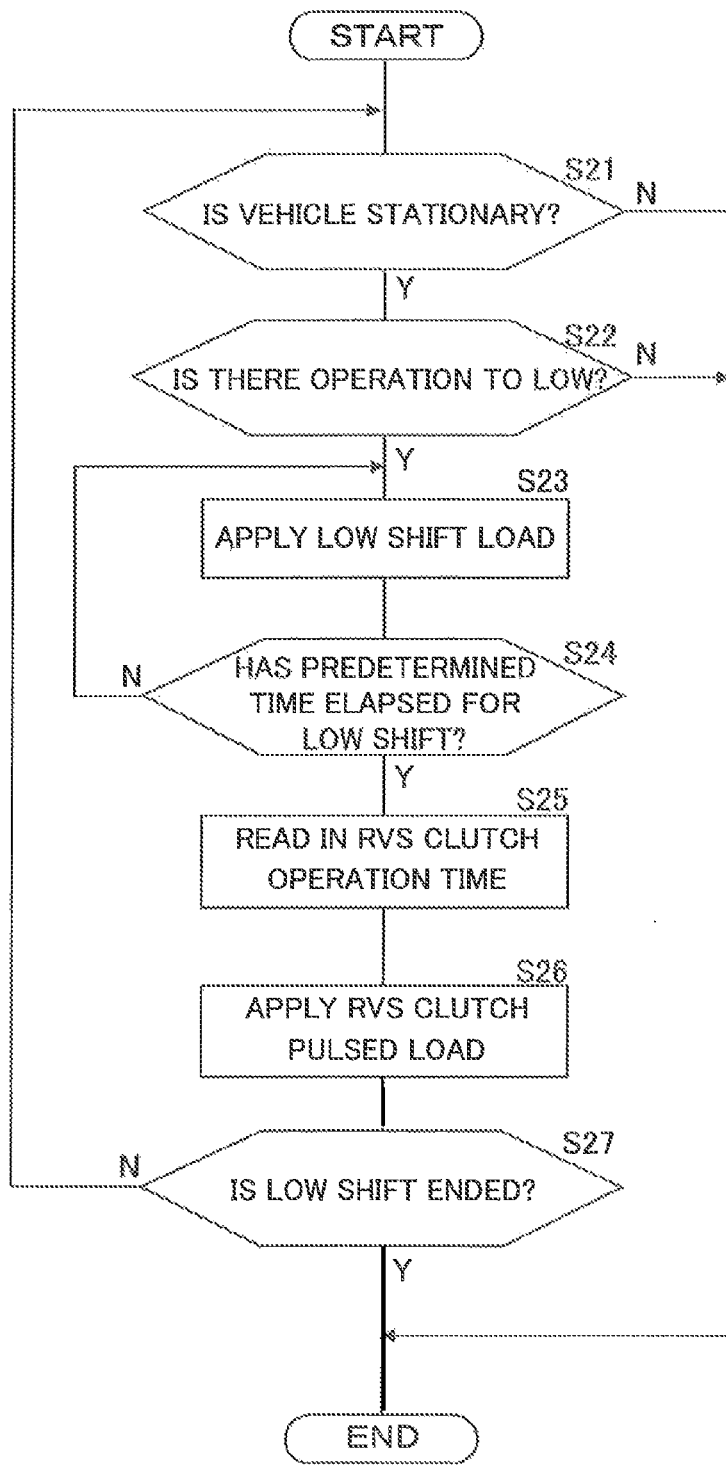
FIG. 8 presents a flow chart at the time of first speed pre-shift.

Turning to FIG. 8, an additional embodiment of the present invention is presented. As explained in reference to step S14 of FIG. 5, in one embodiment, engagement of the reverse clutch CR may begin during synchronization of the first speed pre-shift. Alternatively, in an embodiment of FIG. 8, the reverse clutch CR may be engaged when a predetermined time has elapsed since the commencement of driving of a sleeve 42 of a first speed-third speed synchro device S1 (see FIG. 7). That is, if in step S21 the vehicle is stationary, and in step S22 a shift lever is operated to a "D" position and the first speed-third speed synchro device S1 is operated toward a first speed gear position, then in step S23 a shift load is applied that drives the sleeve 42 of the first speed-third speed synchro device S1 toward a first speed drive gear 21. Additionally, if in step S24 a predetermined time has elapsed, then in step S25 the operation time of the reverse clutch CR corresponding to the oil temperature is read. Furthermore, in step S26 the reverse clutch CR is engaged by means of a pulsed engagement load for the operation time. As a result, in step S27 chamfers 42*a* of the sleeve 42 completely engage with chamfers 43*a* of a blocking ring 43 and dog teeth 21*b* of the first speed drive gear 21 to complete the first speed pre-shift. Additionally, in accordance with this second embodiment, the same operational effects as those of the FIG. 1 embodiment can also be achieved.

Next, an additional embodiment of the present invention is explained by reference to FIG. 9. An embodiment shown in FIG. 1 may employ the twin clutch type transmission T with eight forward speeds and one reverse speed, but a FIG. 9 embodiment shown in FIG. 9 may employ a triple clutch type transmission T with, for example, twelve forward speeds and one reverse speed. The transmission T of FIG. 9 may include a third input shaft 12' having a third clutch C3 in addition to a first input shaft 11 having a first clutch C1 and a second input shaft 12 having a second clutch C2. An idle gear 18 of an idle shaft 14 may mesh with a first driven gear 19 fixedly provided on the second input shaft 12 (the driven gear 19 of the first embodiment) and may also mesh with a second driven gear 19' fixedly provided on the third input shaft 12'. This allows the first input shaft 11, the second input shaft 12, and the third input shaft 12' to rotate in the same direction at a predetermined ratio.

Furthermore, the arrangement of each drive gear, driven gear, and synchro device provided on the first input shaft 11, the second input shaft 12, and an output shaft 13 may be the same as that of FIG. 1. However, because gear positions that are established by the drive gears, the driven gears, and the synchro devices in the FIG. 9 embodiment are different from those of the FIG. 1 embodiment, the same reference numerals and symbols are used to denote different gears and synchro devices in FIGS. 1 and 9.

Figure 9:
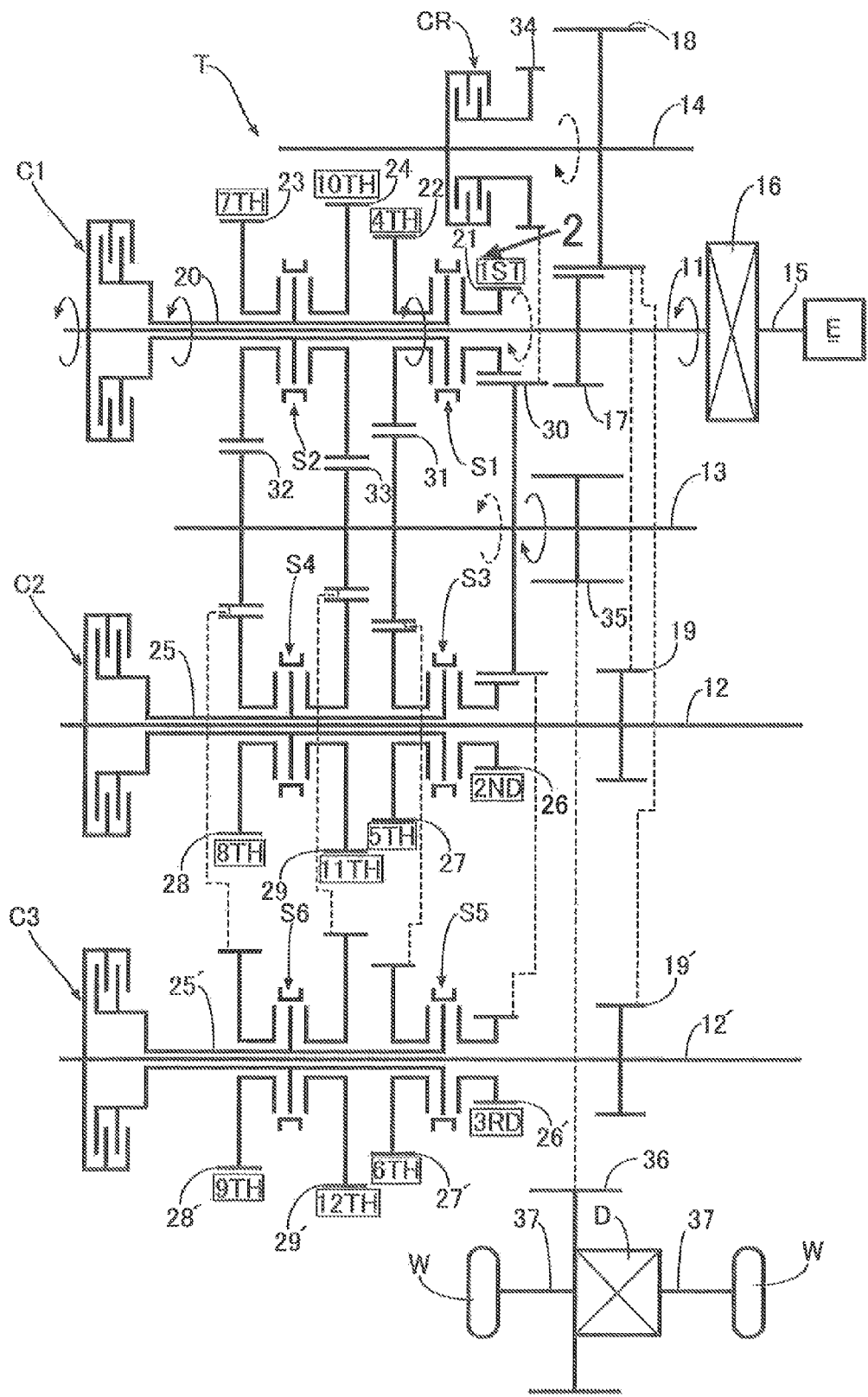
FIG. 9 presents a skeleton diagram of a triple clutch type transmission.

In reference to FIG. 9, a first sleeve 20 may be relatively rotatably fitted around an outer periphery of the first input shaft 11, the first sleeve 20 being capable of being coupled to the first input shaft 11 via a first clutch C1, which may be a wet multi-plate hydraulic clutch. A first speed drive gear 21 may be relatively rotatably supported on the outer periphery of the first input shaft 11, and a fourth speed drive gear 22, a seventh speed drive gear 23, and tenth speed drive gear 24 may be relatively rotatably supported on an outer periphery of the first sleeve 20. The first speed drive gear 21 and the fourth speed drive gear 22 can be coupled to the first sleeve 20 via a first speed-fourth speed synchro device S1. In addition, the seventh speed drive gear 23 and the tenth speed drive gear 24 can be coupled to the first sleeve 20 via a seventh speed-tenth speed synchro device 52.

Furthermore, a second sleeve 25 may be relatively rotatably fitted around an outer periphery of the second input shaft 12, the second sleeve 25 being capable of being coupled to the second input shaft 12 via a second clutch C2, which may be a wet multi-plate hydraulic clutch. A second speed drive gear 26 may be relatively rotatably supported on the outer periphery of the second input shaft 12, and a fifth speed drive gear 27, an eighth speed drive gear 28, and an eleventh speed drive gear 29 may be relatively rotatably supported on an outer periphery of the second sleeve 25. The second speed drive gear 26 and the fifth speed drive gear 27 can be coupled to the second sleeve 25 via a second speed-fifth speed synchro device S3. Furthermore, the eighth speed drive gear 28 and the eleventh speed drive gear 29 can be coupled to the second sleeve 25 via an eighth speed-eleventh speed synchro device S4.

In addition, a third sleeve 25' may be relatively rotatably fitted around an outer periphery of the third input shaft 12', the third sleeve 25' being capable of being coupled to the third input shaft 12' via a third clutch C3, which may be a wet multi-plate hydraulic clutch. A third speed drive gear 26' may be relatively rotatably supported on the outer periphery of the third input shaft 12', and a sixth speed drive gear 27', a ninth speed drive gear 28', and a twelfth speed drive gear 29' may be relatively rotatably supported on an outer periphery of the third sleeve 25'. The third speed drive gear 26' and the sixth speed drive gear 27' can be coupled to the third sleeve 25' via a third speed-sixth speed synchro device S5. Furthermore, the ninth speed drive gear 28' and the twelfth speed drive gear 29' can be coupled to the third sleeve 25 via a ninth speed-twelfth speed synchro device S6.

Additionally, a first speed-second speed-third speed-reverse driven gear 30, a fourth speed-fifth speed-sixth speed driven gear 31, a seventh speed-eighth speed-ninth speed driven gear 32, and a tenth speed-eleventh speed-twelfth speed driven gear 33 may be provided on the output shaft 13. The first speed-second speed-third speed-reverse driven gear 30 may simultaneously mesh with the first speed drive gear 21, the second speed drive gear 26, and the third speed drive gear 26'. The fourth speed-fifth speed-sixth speed driven gear 31 may simultaneously mesh with the fourth speed drive gear 22, the fifth speed drive gear 27, and the sixth speed drive gear 27. The seventh speed-eighth speed-ninth speed driven gear 32 may simultaneously mesh with the seventh speed drive gear 23, the eighth speed drive gear 28, and the ninth speed drive gear 28. The tenth speed-eleventh speed-twelfth speed driven gear 33 may simultaneously mesh with the tenth speed drive gear 24, the eleventh speed drive gear 29, and the twelfth speed drive gear 29'.

In addition, like the first embodiment, a reverse idle gear 34 that can mesh with the first speed-second speed-third speed-reverse driven gear 30 may be relatively rotatably supported on the idle shaft 14. The reverse idle gear 34 may be capable of being coupled to the idle shaft 14 via a reverse clutch CR, which may be a wet multi-plate hydraulic clutch. Similarly, a final drive gear 35 fixedly provided on the output shaft 13 can mesh with a final driven gear 36 fixed to a gear box of a differential gear D, and drive shafts 37 and 37 extending left and right from the differential gear D may be connected to driven wheels W.

Therefore, when the first clutch C1 is engaged in a state in which the first speed drive gear 21 is coupled to the first sleeve 20 via the first speed-fourth speed synchro device S1, a first speed gear position may be established. Additionally, when the second clutch C2 is engaged in a state in which the second speed drive gear 26 is coupled to the second sleeve 25 via the second speed-fifth speed synchro device S3, a second speed gear position can be established. Furthermore, when the third clutch C3 is engaged in a state in which the third speed drive gear 26 is coupled to the third sleeve 25' via the third speed-sixth speed synchro device S5, a third speed gear position may be established.

Additionally, when the first clutch C1 is engaged in a state in which the fourth speed drive gear 22 is coupled to the first sleeve 20 via the first speed-fourth speed synchro device S1, a fourth speed gear position may be established. In addition, when the second clutch C2 is engaged in a state in which the fifth speed drive gear 27 is coupled to the second sleeve 25 via the second speed-fifth speed synchro device S3, a fifth speed gear position may be established. Likewise, when the third clutch C3 is engaged in a state in Which the sixth speed drive gear 27' is coupled to the third sleeve 25' via the third speed-sixth speed synchro device S5, a sixth speed gear position can be established.

In addition, when the first clutch C1 is engaged in a state in which the seventh speed drive gear 23 is coupled to the first sleeve 20 via the seventh speed-tenth speed synchro device S2, a seventh speed gear position may be established. Additionally, when the second clutch C2 is engaged in a state in which the eighth speed drive gear 28 is coupled to the second sleeve 25 via the eighth speed-eleventh speed synchro device S4, an eighth speed gear position can be established. Furthermore, when the third clutch C3 is engaged in a state in which the ninth speed drive gear 28' is coupled to the third sleeve 25 via the ninth speed-twelfth speed synchro device S6, a ninth speed gear position may be established.

Furthermore, when the first clutch C1 is engaged in a state in which the tenth speed drive gear 24 is coupled to the first sleeve 20 via the seventh speed-tenth speed synchro device S2, a tenth speed gear position may be established. Additionally, when the second clutch C2 is engaged in a state in which the eleventh speed drive gear 29 is coupled to the second sleeve 25 via the eighth speed-eleventh speed synchro device S4, an eleventh speed gear position can be established. Moreover, when the third clutch C3 is engaged in a state in which the twelfth speed drive gear 29' is coupled to the third sleeve 25' via, the ninth speed-twelfth speed synchro device S6, a twelfth speed gear position may be established. Furthermore, when the reverse idle gear 34 is coupled to the idle shaft 14 via the reverse clutch CR, a reverse gear position may be established.

In the twin clutch type transmission T of the FIG. 1 and FIG. 8 embodiments, since shifting is carried out by engaging the first and second clutches C1 and C2 in turn, shifting is typically possible exclusively between an odd-number gear position and an even-number gear position, and shifting over two gear positions is impossible. However, in the triple clutch type transmission T of the present embodiment, shifting over two gear positions becomes possible. For example, if, in a state in which the third clutch C3 is engaged and the third speed gear position is established, pre-shifting to the first speed gear position by the first speed-fourth speed synchro device S1 is carried out and the first clutch C1 is engaged, two gear position shifting from the third speed gear position to the first speed gear position can be carried out. Likewise, if pre-shifting to the fifth speed gear position by the second speed-fifth speed synchro device S3 is carried out and the second clutch C2 is engaged, two gear position shifting from the third speed gear position to the fifth speed gear position can be carried out.

Furthermore, not only is it possible to achieve a transmission T with twelve forward speeds without increasing the axial dimension of the transmission T with eight forward speeds of the first and second embodiments, but it is also possible to achieve a transmission T with nine forward speeds while reducing the axial dimension of the transmission T with eight forward speeds of the first and second embodiments by removing one drive gear or driven gear from each of the first input shaft 11, the second input shaft 12, the third input shaft 12', and the output shaft 13.

Since paths for establishing the first speed gear position and the reverse gear position are the same as those of the FIG. 1 and FIG. 8 embodiments described above, in accordance with the present embodiment, temporarily engaging the reverse clutch CR at a stage where rotation of the first speed drive gear 21 and the sleeve 42 of the first speed-fourth speed synchro device S1 is synchronized enables smooth operation of the first speed-fourth speed synchro device S1 in the same manner as the FIG. 1 and FIG. 8 embodiments.

Embodiments of the present invention are explained above, but the present invention may be modified in a variety of ways as long as the modifications do not depart from the gist thereof. For example, the first and second clutches C1 and C2 may be wet clutches in which a drag torque is generated or, other than hydraulic clutches, may be electromagnetic clutches. Furthermore, an actuator for operating the sleeve 42 of the synchro device is not limited to a hydraulic type, and it may be one that is operated by another device such as an electric motor.

Moreover, the reverse clutch CR is not limited to a hydraulic type, and it may be an electromagnetic type or a dry type.

Furthermore, the transmission T of the embodiments includes the torque converter 16, but the invention of the present application may be applied to a transmission T that includes another starting device formed from a wet clutch or a dry clutch instead of the torque converter. Moreover, if the first clutch C1 is used as a starting device, the wet clutch or the dry clutch may be eliminated.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A control system of a transmission, comprising:
   a gear shaft operable to transmit a driving force of a drive source to a driven wheel;
   a forward gear relatively rotatably supported on the gear shaft;
   a forward frictional engagement element operable to transfer the driving force from the drive source to the forward gear;
   a meshing engagement element operable to couple the forward gear to the gear shaft;
   a reverse gear train connected to the forward gear; and
   a reverse frictional engagement element in the reverse gear train, wherein after the meshing engagement element couples the forward gear to the gear shaft, a predetermined forward gear position is established by engaging the forward frictional engagement element, and wherein the reverse frictional engagement element is temporarily engaged in a predetermined operating pattern according to a predetermined parameter when operating the meshing engagement element.

2. The control system of a transmission according to claim 1, wherein the predetermined parameter comprises an oil temperature of the transmission, and the predetermined operating pattern comprises an engagement time for the reverse frictional engagement element.

3. The control system of a transmission according to claim 2, wherein the lower the oil temperature, the longer the engagement time is set.

4. The control system of a transmission of claim 1, wherein the transmission comprises:
   an input shaft;
   an idle shaft that rotates in a reverse direction to a rotation direction of the input shaft; and
   an output shaft that is driven by the input shaft or the idle shaft,
   wherein a gear provided on the output shaft meshes with the forward gear and a reverse idle gear provided on the idle shaft, and
   wherein the reverse idle gear can be coupled to the idle shaft by the reverse frictional engagement element.

5. The control system of a transmission of claim 4, wherein the input shaft comprises the gear shaft.

6. The control system of a transmission of claim 4, wherein the reverse frictional engagement element comprises a hydraulic clutch.

7. The control system of a transmission of claim 2, wherein the transmission comprises:
   an input shaft;
   an idle shaft that rotates in a reverse direction to a rotation direction of the input shaft; and
   an output shaft that is driven by the input shaft or the idle shaft,
   wherein a gear provided on the output shaft meshes with the forward gear and a reverse idle gear provided on the idle shaft, and
   wherein the reverse idle gear can be coupled to the idle shaft by the reverse frictional engagement element.

8. The control system of a transmission of claim 7, wherein the input shaft comprises the gear shaft.

9. The control system of a transmission of claim 7, wherein the reverse frictional engagement element comprises a hydraulic clutch.

10. The control system of a transmission of claim 3, wherein, the transmission comprises:
    an input shaft;
    an idle shaft that rotates in a reverse direction to a rotation direction of the input shaft; and
    an output shaft that is driven by the input shaft or the idle shaft,
    wherein a gear provided on the output shaft meshes with the forward gear and a reverse idle gear provided on the idle shaft, and
    wherein the reverse idle gear can be coupled to the idle shaft by the reverse frictional engagement element.

11. The control system of a transmission of claim 10, wherein the input shaft comprises the gear shaft.

12. The control system of a transmission of claim 10, wherein the reverse frictional engagement element comprises a hydraulic clutch.

* * * * *